United States Patent
Yahle

[11] 3,780,759
[45] Dec. 25, 1973

[54] REUSABLE PRESSURE RELEASE VALVE

[75] Inventor: Daniel I. Yahle, Orlando, Fla.

[73] Assignee: The United States of America

[22] Filed: Apr. 10, 1972

[21] Appl. No.: 242,553

[52] U.S. Cl. ............................................. 137/467
[51] Int. Cl. ............................................. F16k 17/06
[58] Field of Search .......................... 137/467, 456

[56] References Cited
UNITED STATES PATENTS

| | | |
|---|---|---|
| 2,217,880 | 10/1940 | Woodson ............................ 137/467 |
| 3,530,868 | 9/1970 | Rickards ........................ 137/467 X |
| 3,409,037 | 11/1968 | Nelson ............................ 137/467 X |
| 3,592,222 | 7/1971 | Goss ................................... 137/467 |

Primary Examiner—William R. Cline
Attorney—William G. Gapcynski et al.

[57] ABSTRACT

A reusable release valve for use in checking fluid systems, in areas such as missile stage controls, and to dump the fluid at a predetermined pressure. The system fluid causes pressure on a piston to release a latching mechanism whereby the system fluid is dumped through the release valve. After fluid dumping the valve is disassembled and reset for reuse.

3 Claims, 2 Drawing Figures

PATENTED DEC 25 1973 3,780,759

REUSABLE PRESSURE RELEASE VALVE

BACKGROUND OF THE INVENTION

This invention relates to the field of pressure release valves. Considerable cost has accompanied each system checkout, for at that time, several diaphragms are expended and cannot be reworked, hence they are a one shot device.

SUMMARY OF THE INVENTION

The present invention provides a control pressure release at a desirable pressure with close tolerances. In addition, the piston valve of this invention is a reusable item in that it is not damaged when operated and can be disassembled and reset for reuse.

This invention may be better understood from the following detailed description taken in conjunction with the accompanying drawing.

DESCRIPTION OF THE PREFERRED EMBODIMENT

Figure 1:
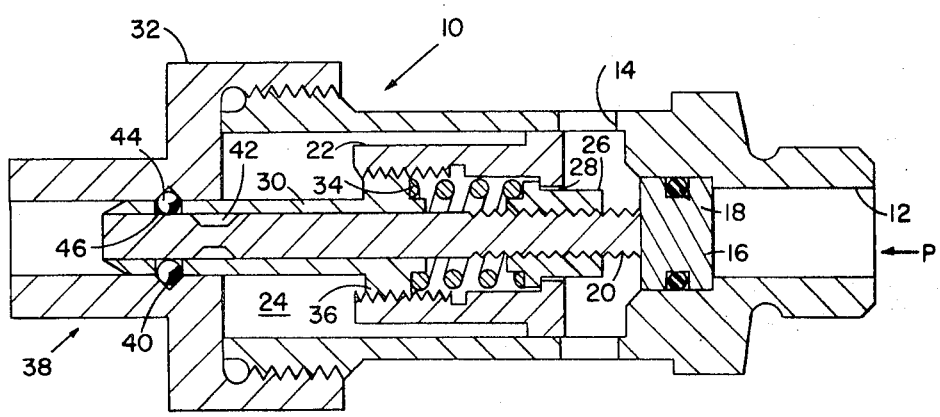
FIG. 1 shows the valve in the closed position.

Reference numeral 10 generally indicates a valve body having an inlet port 12 and a plurality of outlet ports 14. A piston 16 including an o-ring 18 controls the opening of inlet port 12. Piston 16 abuts against a plunger 20 which extends away from port 12 through a retainer housing 22 which is located in chamber 24 of the body 10. A gland nut 26 is mounted for slidable movement through an opening 28 in one end of the retainer housing and is adjustably connected to plunger 20. A quick release pin 30 is connected to the opposite end of the retainer housing and extends through an end cap 32 connected to body 10 for supporting plunger 20 and pin 30. Spring 34 is located inside housing 22 between a shoulder 36 and the gland nut. The spring is compressed by adjusting the gland nut which provides a predetermined pressure on piston 16. The plunger 20, quick release pin 30 and end cap 32 are provided with a latching means generally indicated as 38 to prevent movement of the release pin and the housing 22 connected thereto. The latching means includes recesses 40 in the end cap, recesses 42 in the plunger and latching balls 44 carried in openings 46 of release pin 30. This pin is unlatched when fluid moves the plunger to a position where balls 44 are caused to move from their latching position shown in FIG. 1 to an unlatched position shown in FIG. 2. As the plunger recesses are brought beneath balls 44 they will shift out of recesses 40 and into recesses 42. This unlatching action takes place before housing 22 moves and as soon as unlatching occurs the plunger and retainer housing move in unison to quickly open inlet port 12 for fluid dumping. This action will quickly allow the plunger and the retainer housing to move to the position shown in FIG. 2 and thereby open inlet port 12 for fluid dumping.

Figure 2:
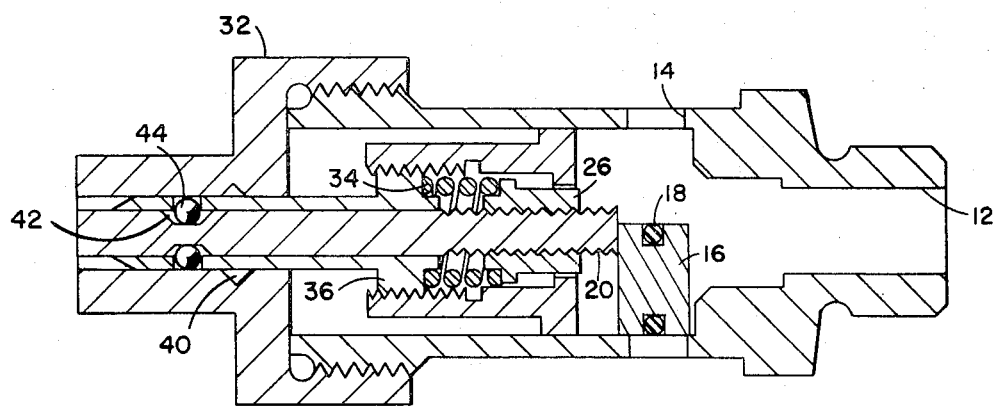
FIG. 2 shows the valve in the open position.

The operation of the reusable pressure release valve, shown in FIG. 1, is as follows: when the pressure of fluid P reaches a predetermined valve during system checkout, piston 16 compresses spring 34 and the piston starts to move away from port 12. Continuing pressure on the piston will cause plunger 20 to bring recesses 42 into alignment with balls 44. When alignment is reached the balls will move into recesses 42 thereby releasing pin 30. With the release pin disengaged from the cap 32, the piston and housing 22 quickly move together to open port 12. When the system fluid pressure diminishes the force causing piston 16 to abut against plunger 20 also decreases. Piston 16 will then fall into the cavity of valve body 10, as shown in FIG. 2. The fluid under system pressure is then free to flow through the body and out ports 14. It is noted that there is no back pressure when both the piston and housing move away from the inlet port as would be caused by a check valve set to operate at an equivalent level. After fluid dumping the valve is disassembled and reset for reuse.

I claim:

1. A reusable pressure release valve for use in checking fluid systems and to dump the fluid at a predetermined pressure, said valve comprising: a body having inlet and outlet ports for passing fluid therethrough, a chamber in said body; a piston in said body having one side closing said inlet port; a retainer housing moveably mounted in said chamber on the opposite side of said piston, said retainer housing including means for exerting a predetermined biasing force, a plunger supported by said retainer housing for exerting said biasing force on said opposite side of said piston, said plunger extending away from said inlet port; an end cap connected on one end of said body opposite said inlet port; and latching means located between said end cap and said plunger to restrain movement of said retainer housing until said predetermined biasing force is overcome by the pressure of said fluid, said piston moving a predetermined degree of travel to cause release of said latching means and allow fluid dumping.

2. A reusable pressure release valve as set forth in claim 1 wherein said means for exerting a predetermined biasing force pressure includes a gland nut adjustably connected with said plunger and slidably mounted in said retainer housing, and a spring located in said retainer housing between said gland nut and said retainer housing to load said plunger and apply the predetermined biasing force on said piston.

3. A reusable pressure release valve as set forth in claim 2 wherein said latching means includes recesses provided in said cap, a release pin connected with said retainer housing and surrounding and provided with openings therein, and latching balls placed in said openings for cooperation with said recesses to secure said retainer housing to said end cap, and said plunger being provided with recesses for unlatching said balls when said plunger recesses are moved into alignment with said balls.

* * * * *